March 12, 1946.  G. W. WATERMAN  2,396,307
CAM-ACTION ARC-OXYGEN UNDERWATER CUTTING TORCH
Filed Aug. 15, 1944

Inventor
GEORGE W. WATERMAN

Patented Mar. 12, 1946

2,396,307

UNITED STATES PATENT OFFICE 2,396,307

CAM-ACTION ARC-OXYGEN UNDERWATER CUTTING TORCH

George W. Waterman, Hyattsville, Md.

Application August 15, 1944, Serial No. 549,603

8 Claims. (Cl. 219—15)

(Granted under the act of March 3, 1883, as amended April 30, 1928; 370 O. G. 757)

This invention relates to arc-oxygen torches and more specifically to improvements in underwater cutting torches.

In underwater salvage work it is important that cutting torches be of such construction that the electrode can be removed and replaced with a minimum of manipulation and without special tools, since the operator's hands are encased in heavy gloves which make the manipulation of threaded couplings or the handling of tools difficult, if not impossible. Accordingly, it is an object of this invention to provide an arc-oxygen torch with readily operable means for releasably locking the electrode in its chuck and which will not be rendered ineffective by dirt and corrosion.

As illustrated, the torch is of the type in which a hollow electrode is employed through which oxygen is passed to the working surface, the electrode being held in a chuck which is provided with an opening through which the oxygen is supplied to the electrode. The invention resides in surrounding the opening in the chuck with a washer against which the electrode may be seated and means for removably locking the electrode in the socket against the washer. More specifically, the means for releasably locking the electrode in the chuck is a cam mounted on the chuck in a position to be moved through an opening formed in the wall of the chuck into contact with the electrode, a cam shaft for rotatably supporting the cam, and a lever for effecting rotation of the cam shaft in a direction to move the cam through the opening from the open end of the chuck toward the bottom thereof.

The details of my invention will now be described with reference to the accompanying drawing, in which.

Figure 1:
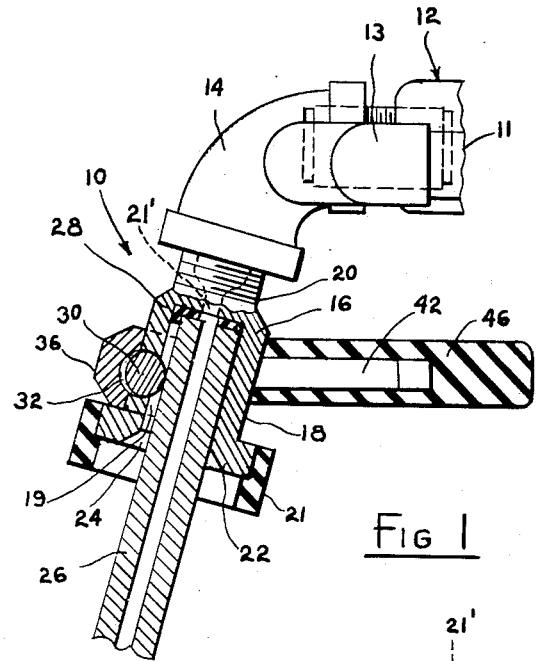
Fig. 1 is an elevation in section of the operating head of an arc-oxygen torch embodying my invention showing the cam in operative position.

Referring to Fig. 1 there is shown an operating head 10 of an arc-oxygen torch, the body portion 12 of which is broken off, since it is not necessary to a complete understanding of the present invention. In this type of torch, oxygen is supplied through the body 12 to the head 10 and thence to a hollow electrode 26. The head 10 is attached to the body 12 by an elbow coupling 14 and electric current is supplied to the electrode 26 by way of a cable 11 connected to the body at 13 all of which is conventional. In the present instance, the elbow coupling 14 preferably has about a 120° bend therein, this angle being selected because it affords a convenient working position for the operator; however, it is to be understood that an elbow of any other degree bend may be employed if desirable.

Figure 3:
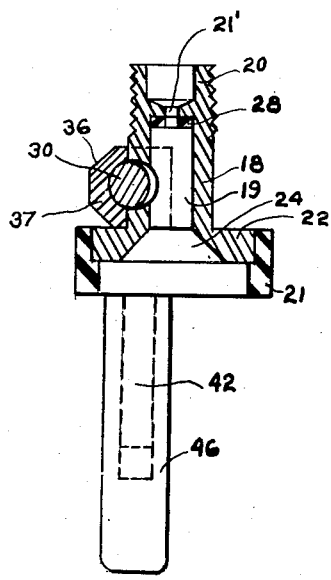
Fig. 3 is a section similar to Fig. 1 showing the cam in inoperative position.
Figure 2:
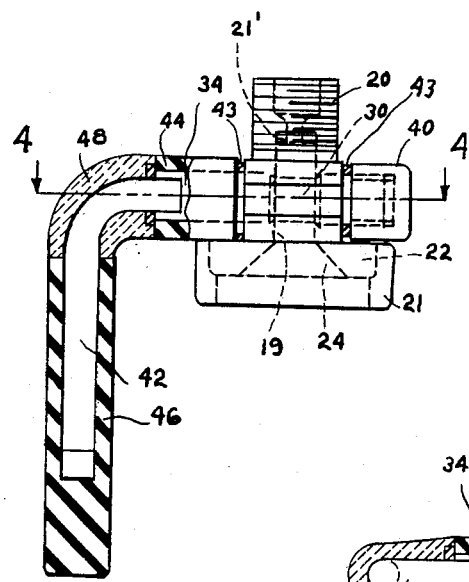
Fig. 2 is a plan view of the head.
Figure 4:
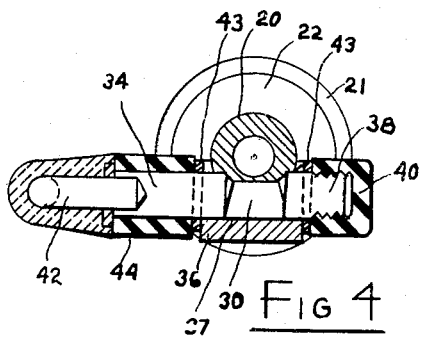
Fig. 4 is a section on the line 4—4 of Fig. 2.

The head 10 comprises a chuck 16 which consists of a cylindrical body 18 having a socket 19 therein, the cylindrical body terminating at one end in a threaded neck 20 adapted to be threaded into the elbow coupling 14 and at the other end in a radial flange 22. A collar 21 composed of an insulating material, for example Micarta, is cemented or otherwise attached to the peripheral surface of the flange to prevent accidental arcing when the electrode becomes short and in case the flange is brought too close to the work during manipulation of the torch. The flange 22 is counter-sunk at 24 to facilitate inserting the hollow electrode 26 into the socket 19 and the bottom of the socket is apertured at 21' to provide for the conduction of oxygen to the hollow electrode from the body 12. The important feature of the present invention resides in the means for holding the hollow electrode 26 in the socket 19 of the chuck 16 in such a manner that it makes good electric contact with the inner wall of the socket and is also seated against the bottom of the socket in such a manner as to prevent leakage of the oxygen between the bottom of the socket and the butt end of the electrode which would permit oxygen to leak around the outside of the electrode between it and the walls of the socket. It is essential to stop such leakage to prevent loss of oxygen, the loss of pressure at the working end of the electrode and to reduce oxidation within the socket which would cause rapid deterioration of the apparatus. To this end there is placed in the chuck at the bottom of the socket an annular rubber washer 28 which surrounds the aperture through which the oxygen is led. The electrode 26 is forced against the washer 28 and against the wall of the socket by a cam 30 which is mounted on the chuck 16 in a position to be moved through an opening 32 formed in the wall of the socket, thereby to engage the electrode 26. The cam 30 is formed on a cam shaft 34 which is journalled in a boss 36 formed on the side of the chuck adjacent to the flange 22, the boss having a cylindrical bore 37 running through it at right angles to the axis of the socket. One end of the cam shaft 34 is threaded at 38 and is adapted to receive a threaded cap 40. Preferably, and as shown, the cap is made of an insulating material such as Micarta. The opposite end of the cam shaft 34 extends laterally of the boss 36 and terminates in a handle 42 extending at right angles thereto. In order to hold the cam shaft from longitudinal displacement, washers 43 are placed on the cam shaft at the opposite ends of the boss 36 and there are telescopically arranged on the projecting end of the cam shaft and handle a sleeve 44, an elbow 48 and a gripping member 46. The elbow 48 holds the sleeve 44 from longitudinal movement on the cam shaft and when the cap 50 is brought up tightly against the one washer 43 the ends of the sleeve 44 are held in sealable engagement with the other washer 43 and the elbow 48. The sleeve 44 and gripping member 46 are formed of insulating material, preferably Micarta, while the elbow is formed of a fabric such as tape impregnated with plastic. In Fig. 3 the handle is shown vertically downward and in this position the cam 30 is in an inoperative position so that the electrode 26 may be inserted into the socket 14 and pushed against the rubber washer 28 at the bottom of the socket. In order to lock the electrode in the socket and to force it into sealing engagement with the rubber washer, the handle 42 is rotated to the position shown in Fig. 1 which causes the cam to enter the socket from the bottom of the opening 32 and to force the electrode 26 transversely of the socket into engagement with the opposite wall, with sufficient force to form a good electric contact and simultaneously to force the electrode longitudinally in the socket toward the bottom thereof into sealing engagement with the washer 28. The force exerted on the electrode is sufficient to cause it to compress the rubber washer to such an extent as to insure a gas and watertight seal under working pressures. It is evident with the aforesaid construction that when the electrode is consumed, the butt end thereof may readily be removed by tipping the handle 42 downwardly to the position shown in Fig. 3. Due to the fact that the socket 14 is materially larger in diameter than the electrode, there is no danger of the remaining butt end of the electrode lodging in the socket so that special tools are necessary to remove it, and furthermore very little care is required in inserting the electrode in the socket and locking it in place.

The operation of the device is plain from the above construction, and consists merely of rotating the handle 42 to a vertical position, inserting the electrode 26 into the socket and then rotating the handle to a horizontal position. When the electrode has been used up it may be removed merely by rotating the handle back to a vertical position whereupon the butt or used end of the electrode will drop out. This greatly facilitates underwater operation, since the operator can quickly remove and replace the electrode with a minimum of difficulty even when encumbered with heavy gloves and when working under adverse conditions.

The invention described herein may be manufactured and used by or for the Government of the United States of America for governmental purposes without the payment of any royalties thereon or therefor.

What is claimed is:

1. In an arc-oxygen cutting torch, a chuck for holding one end of a hollow electrode adapted to conduct a stream of oxygen to the surface to be operated upon, said chuck having an aperture therein through which oxygen is delivered to said one end of the hollow electrode, a washer seated in said chuck around the aperture against which said one end of the electrode is held, and means for releasably locking the electrode in the chuck against the washer said means being adapted to exert forces on said electrode diametrically thereof and longitudinally thereof, said latter force being toward the socket.

2. In an arc-oxygen cutting torch, a chuck for receiving one end of a hollow electrode adapted to conduct a stream of oxygen to the surface to be operated upon, said chuck having an aperture therein through which oxygen is delivered to said one end of the hollow electrode, a seat around said aperture against which said one end of the electrode is held, and means for releasably locking said one end of the electrode against said seat said means being adapted to exert forces on said electrode, both transversely and longitudinally thereof, said latter force being in the direction of the bottom of the chuck.

3. In an arc-oxygen cutting torch, a chuck for receiving one end of a hollow electrode adapted to conduct a stream of oxygen to the surface to be operated upon, said chuck having an aperture therein through which oxygen is delivered to said one end of the hollow electrode, a washer seated in said chuck around the aperture against which said one end of the electrode is held, and means for releasably forcing said one end of the electrode into contact with the wall of the chuck to insure electric contact therewith, and into engagement with the washer to provide a gastight seal between said one end of the electrode and the aperture in the chuck.

4. An arc-oxygen cutting torch, a chuck for receiving one end of a hollow electrode adapted to conduct a stream of oxygen to the surface to be operated upon, said chuck having an aperture therein through which oxygen is delivered to said one end of the hollow electrode, a washer seated in said chuck around the aperture against which said end of the electrode is held, and means for simultaneously applying a force along the longitudinal axis of the electrode and at right angles thereto.

5. An arc-oxygen cutting torch, a chuck for receiving one end of a hollow electrode adapted to conduct a stream of oxygen to the surface to be operated upon, said chuck having an aperture therein through which oxygen is delivered to said one end of the hollow electrode, a washer seated in said chuck around the aperture against which said end of the electrode is held, and a cam operable simultaneously to apply a force to press the electrode into engagement with the wall of the chuck, and to apply a force to press the end of the electrode into engagement with the washer.

6. In an arc-oxygen cutting torch, a chuck having a cylindrical socket-like aperture adapted to receive one end of a hollow electrode, said socket having an oxygen inlet aperture therein against which the one end of the hollow electrode is held and an opening in its wall, a cam mounted on said chuck in a position to project into the opening in the wall of the socket, and means for rotating the cam to cause it to move into the socket through said opening from the open end of the socket toward the bottom thereof.

7. In an arc-oxygen cutting torch, a chuck having a cylindrical socket-like opening adapted to receive one end of a hollow electrode, said socket having an oxygen inlet aperture therein against which the one end of the hollow electrode is held and an opening in the wall, a housing on said chuck having a bore therein which intercepts said opening in the wall, a cam shaft rotatably mounted in said bore, a cam on said cam shaft adapted to be projected through said opening in the wall by rotation of the cam shaft, and means for effecting rotating of the cam shaft to cause the cam to move through the opening into the socket from the open end of the socket toward the bottom thereof.

8. In an arc-oxygen cutting torch, a chuck for receiving one end of a hollow electrode adapted to conduct a stream of oxygen to the surface to be operated upon, said chuck having an aperture therein through which oxygen is delivered to said one end of the hollow electrode, a washer seated in said chuck around the aperture against which said end of the electrode is held, and a cam operable simultaneously to apply a force to press the electrode into engagement with the wall of the chuck, and to apply a force to press the end of the electrode into engagement with the washer, the operating surface of said cam comprising a truncated recess adapted to engage the electrode at three points.

GEORGE W. WATERMAN.